(12) United States Patent
Betz et al.

(10) Patent No.: US 9,358,949 B2
(45) Date of Patent: Jun. 7, 2016

(54) BELT TENSIONER FOR A SAFETY BELT SYSTEM

(71) Applicant: TRW Automotive GmbH, Alfdorf (DE)

(72) Inventors: Hans-Peter Betz, Bobingen (DE); Dominik Seitzer, Schwaebisch Gmuend (DE); Ruediger Karl, Weilheim (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/352,339

(22) PCT Filed: Oct. 22, 2012

(86) PCT No.: PCT/EP2012/004414
§ 371 (c)(1),
(2) Date: Apr. 17, 2014

(87) PCT Pub. No.: WO2013/060439
PCT Pub. Date: May 2, 2013

(65) Prior Publication Data
US 2014/0265517 A1   Sep. 18, 2014

(30) Foreign Application Priority Data

Oct. 27, 2011   (DE) .......................... 10 2011 117 052

(51) Int. Cl.
*B60R 22/46*   (2006.01)
*B60R 22/34*   (2006.01)
*B60R 22/195*  (2006.01)

(52) U.S. Cl.
CPC ......... *B60R 22/3408* (2013.01); *B60R 22/1952* (2013.01); *B60R 22/1954* (2013.01); *B60R 22/46* (2013.01); *B60R 22/4619* (2013.01);

(Continued)

(58) Field of Classification Search
CPC ............ B60R 22/4619; B60R 22/4623; B60R 22/1952; B60R 22/1953; B60R 2022/3427; B60R 2022/4642; B60R 2022/4647
USPC .................. 242/374, 379, 376; 280/806, 807; 297/480, 475
See application file for complete search history.

(56) References Cited

U.S. PATENT DOCUMENTS 3,942,740 A * 3/1976 Torphammar .......... B60R 22/38
                                                        242/383
5,401,216 A * 3/1995 Fujikawa ................ B60P 7/083
                                                        474/130

(Continued)

FOREIGN PATENT DOCUMENTS

DE        10313551       9/2004
DE     102006031360   * 10/2007  .............. B60R 22/46

(Continued)

*Primary Examiner* — Keith Frisby
(74) *Attorney, Agent, or Firm* — Tarolli, Sundheim, Covell & Tummino LLP

(57) ABSTRACT

A belt tensioner for a seat belt system includes a belt shaft housing, a belt shaft pivoted about an axis in the belt shaft housing, a rope reel tightly connected to the belt shaft. A tensioner drive includes a tensioner tube, a deformable plastic element guided to be longitudinally movable in the tensioner tube, a drive pinion and a pull rope which is partly wound onto the rope reel. The plastic element is adapted to engage in the drive pinion and to drive the drive pinion in the tensioning direction. During rotation of the drive pinion the pull rope is wound onto a rope drum of the drive pinion, on the one hand, and is unwound from the rope reel, on the other hand, while the belt shaft rotates.

14 Claims, 11 Drawing Sheets

(52) U.S. Cl.
CPC ..... *B60R 22/4628* (2013.01); *B60R 2022/3427* (2013.01); *B60R 2022/4642* (2013.01); *B60R 2022/4647* (2013.01)

(56) References Cited

U.S. PATENT DOCUMENTS 5,788,176 A * 8/1998 Ebner et al. .................. 242/374

2003/0010858 A1 1/2003 Wier

FOREIGN PATENT DOCUMENTS

| EP | 1526047 | | 4/2005 | |
| --- | --- | --- | --- | --- |
| EP | 1607287 | | 12/2005 | |
| WO | 99/19176 | | 4/1999 | |
| WO | WO 99/19176 | * | 4/1999 | ............ B60R 22/34 |

\* cited by examiner

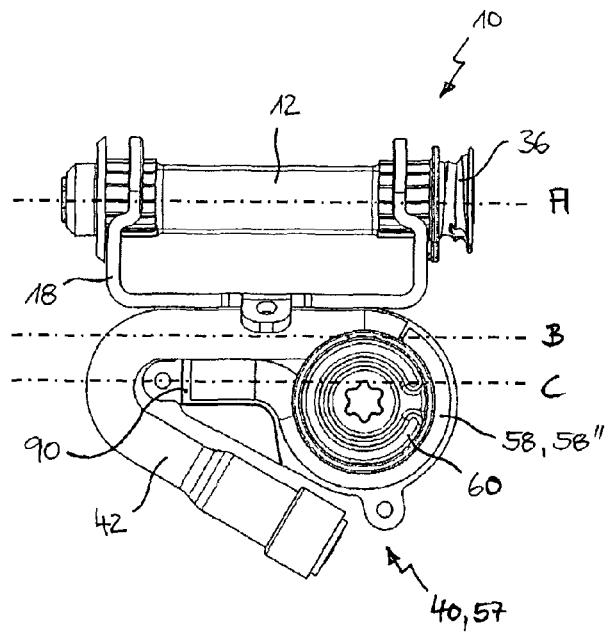
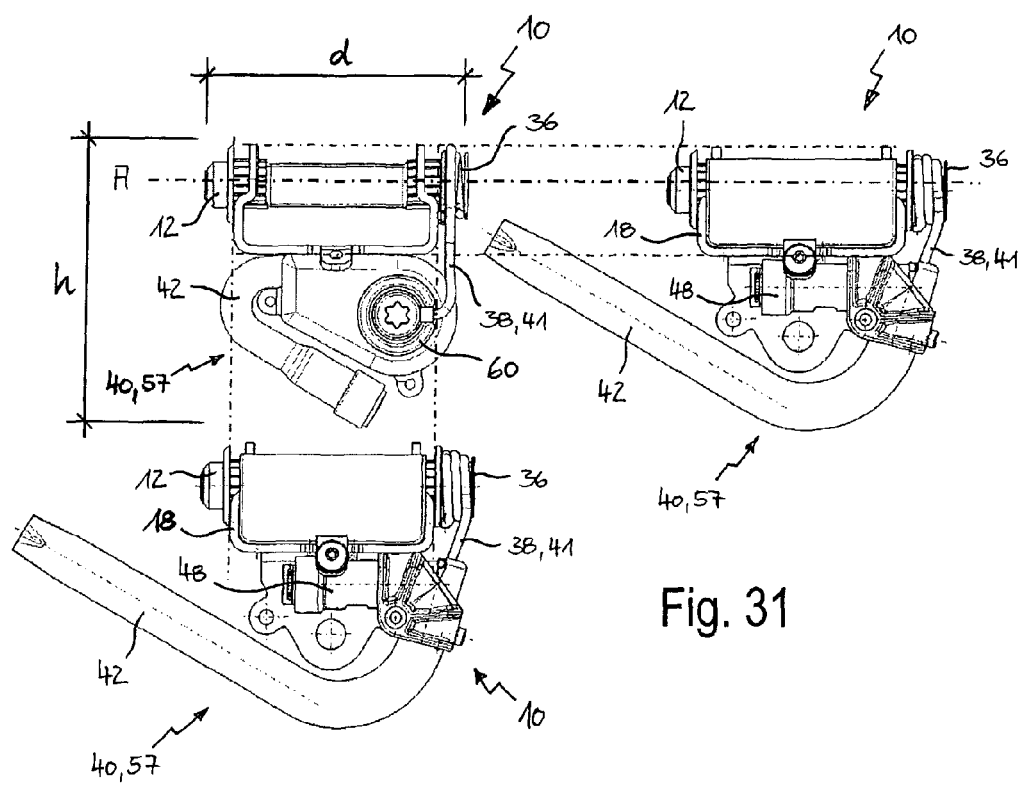

BELT TENSIONER FOR A SAFETY BELT SYSTEM

RELATED APPLICATIONS

This application corresponds to PCT/EP2012/004414, filed Oct. 22, 2012, which claims the benefit of German Application No. 10 2011 117 052.2, filed Oct. 27, 2011, the subject matter, of which are incorporated herein by reference in their entirety.

BACKGROUND OF THE INVENTION

The invention relates to a belt tensioner for seat belt systems in vehicles, especially to an end fitting tensioner.

Belt tensioners for seat belt systems are generally known already from automotive engineering. In so-called end fitting tensioners in the case of activation of the belt tensioner the actually fixed end of a webbing usually connected to the seat frame or the vehicle body is tightened in order to provide for tensioning of the entire webbing. In the state of the art both linearly operating as well as rotatory end fitting tensioners are described. In the rotatory end fitting tensioners the webbing end is connected to a belt shaft which is driven upon activation of the belt tensioner so as to wind webbing onto the belt shaft.

For the assembly of the seat belt system, especially in respect of end fitting tensioners increasingly a process is desired in which the webbing end is secured to the belt tensioner only after the belt tensioner has been mounted on the vehicle body or on the seat frame.

In order to permit said subsequent securing of the webbing, DE 103 13 551 B3 suggests a seat belt retractor in which a hollow belt shaft pivoted in the belt shaft housing includes an end-side aperture and an axially aligned belt shaft slit. Moreover, in a housing leg of the belt shaft housing a feed-through slit is further provided so that the end of the webbing formed as end loop can be introduced into the hollow belt shaft in the axial direction together with a belt pin inserted in the end loop and can be fixed there.

Such subsequent arrangement of the webbing at the belt shaft requires considerable space in the axial direction, however, which is not always provided in the area of an already mounted end fitting tensioner. Consequently, in cramped space conditions the suggested securing of the webbing end to the belt shaft is not possible or only possible with great assembly efforts. In addition, due to said frequently cramped space conditions in the area of the end fitting tensioner an especially compact tensioner design is generally desirable.

Hence it is the object of the invention to provide a compact belt tensioner in which especially the end of a webbing can be subsequently secured to a belt shaft of the rotatory belt tensioner with little assembly effort.

SUMMARY OF THE INVENTION

This object is achieved according to the invention by a belt tensioner for a seat belt system comprising a belt shaft housing, a belt shaft pivoted about an axis in the belt shaft housing, a rope reel fixedly connected to the belt shaft as well as a tensioner drive including a tensioner tube, a deformable plastic element guided to be longitudinally movable in the tensioner tube, a drive pinion and a pull rope which is partly wound onto the rope reel, wherein the plastic element can engage in the drive pinion and drive the drive pinion in the tensioning direction and wherein upon rotation of the drive pinion the pull rope is wound onto a rope drum of the drive pinion, on the one hand, and is unwound from the rope reel, on the other hand, while the belt shaft rotates. Such tensioner drive has very high operating reliability and moreover permits an extremely compact design of the belt tensioner, in particular in the axial direction.

The deformable plastic element is preferably formed in one part, i.e. the drive is performed by one single driven mass element. For this purpose, the plastic element is substantially cylindrical and its length is a multiple of its diameter. Upon interaction with the drive pinion, the teeth of the latter dig themselves into the plastic element which is accordingly deformed. It is equally reasonable to provide a first plastic element which is very long compared to its diameter to which several definitely shorter plastic elements are connected on the side facing away from the drive pinion in the initial state. In this case, too, the length of the individual plastic elements is a multiple of the diameter.

In an advantageous embodiment the belt tensioner comprises a belt shaft inserting element to which one end of the webbing is fastened, wherein the belt shaft includes a recess for receiving the belt shaft inserting element and wherein the belt shaft inserting element can be introduced substantially radially into the recess. Hence in this case no axial mounting space is required to fasten the webbing end to the belt shaft. The radial mounting space required instead is present anyway, on the other hand, as in the completely assembled state of the seat belt system the webbing extends radially away from the belt shaft across exactly said space used for webbing fastening.

In this embodiment of the belt tensioner the belt shaft includes a fork bearing for fixing the belt shaft inserting element in a rotationally fixed manner, the belt shaft inserting element being adapted to be introduced substantially radially into the fork bearing. Said fork bearing permits a rotationally fixed connection between the belt shaft inserting element and the belt shaft at low costs. For this purpose, the belt shaft inserting element is configured as a thick plate or rod of substantially rectangular or trapezoid cross-section and is received in the fork bearing in an accurately fitting manner.

Preferably, opposed axial ends of the belt shaft inserting element extend axially beyond the webbing, the axial ends being configured as bearing portions for bearing the belt shaft inserting element in the belt shaft. Thus it is ensured in a simple manner that the bearing portions of the belt shaft inserting element do not obstruct winding of webbing during the tensioning operation.

Furthermore, the belt shaft inserting element can be symmetric, especially a symmetric steel plate. Said symmetry facilitates subsequent securing of the webbing to the belt shaft and prevents faulty mounting.

In the belt tensioner according to the invention the end of the webbing is preferably stitched to form a loop, the loop enclosing at least part of the belt shaft inserting element. The design of a loop constitutes a simple, inexpensive and reliable option of securing a webbing end.

In another embodiment of the belt tensioner, at its axial ends the belt shaft includes shaft butts connected by a belt shaft land. In this way, in the area of the belt shaft land the belt shaft inserting element including the webbing secured thereto can be easily accommodated, while the shaft butts permit simple support of the belt shaft rotatable about an axis in the belt shaft housing.

In this embodiment of the belt tensioner preferably in at least one shaft butt a fork bearing for the belt shaft inserting element is formed. For example, the fork bearing is a radial bearing slit in the shaft butt in which a bearing portion of the belt shaft inserting element positively engages so as to connect the belt shaft inserting element to the belt shaft in a rotationally fixed manner.

Preferably the belt shaft and, especially preferred, also the belt shaft housing have a symmetric design. Analogously to the symmetric design of the belt shaft inserting element, this symmetry, too, contributes to a reduction of mounting faults and thus to easier assembly. Moreover, due to the symmetric individual components both a belt tensioner for the driver side and (mirror-inverted) a belt tensioner for the passenger side of a vehicle can be assembled with identical component parts. Thus the variety of component parts and the related storage costs are reduced and the assembly of the seat belt system is further facilitated.

In another embodiment of the belt tensioner the belt shaft housing is U-shaped in an axial section and includes a housing land as well as two opposite housing legs, each housing leg having a housing aperture through which the belt shaft extends. Such belt shaft housing can be manufactured as bent stamping of sheet metal, especially sheet steel, at low costs.

In this embodiment, preferably a distance between the housing legs is larger in the area of the housing land than in the area of the free leg ends. Sort of an "omega" shape of the belt shaft housing is resulting, whereby the belt forces occurring can be easily absorbed. Moreover, an advantageous bearing for the belt shaft is provided so that the belt shaft can be a cast part, especially made of zinc die cast.

Preferably in this embodiment of the belt tensioner the distance between the housing legs varies in the area of the housing apertures, in an especially preferred manner exclusively in the area of the housing apertures.

In an especially advantageous embodiment of the belt tensioner an axial dimension of the belt shaft substantially corresponds to an axial dimension of the tensioner drive. In this way a particularly compact belt tensioner is formed whose axial dimension is substantially determined by the width of the webbing to be wound and by the required dimension of the belt shaft resulting therefrom. The tensioner drive is adapted to this axial dimension so that an axial space required by the belt tensioner is minimal. In the present case axial dimensions substantially corresponding to each other are referred to when the (axial) difference in length between the belt shaft and the tensioner drive is less than 10%, preferably less than 5%.

Of preference, in such belt tensioner a tubular axis of the tensioner tube extends in portions in parallel to the axis of rotation of the belt shaft.

Furthermore, the tensioner drive may include a housing in which a linear receiving space for the deformable plastic element is formed after activating the belt tensioner, wherein the linear receiving space in portions extends in parallel to the axis of rotation of the belt shaft. These features contribute to an extremely compact design of the belt tensioner, especially in a direction orthogonal to the axis of rotation.

BRIEF DESCRIPTION OF THE DRAWINGS

Further features and advantages of the invention are evident from the following description of preferred embodiments with reference to the drawings, in which:

FIG. 30 shows the top view of the belt tensioner according to FIG. 25 without the pull rope and the housing of the tensioner drive; and FIG. 31 shows a sketch for comparing the space of the belt tensioner according to FIGS. 1 to 4 and of the belt tensioner according to FIGS. 24 to 29.

DESCRIPTION OF EXEMPLARY EMBODIMENTS

Figure 1:
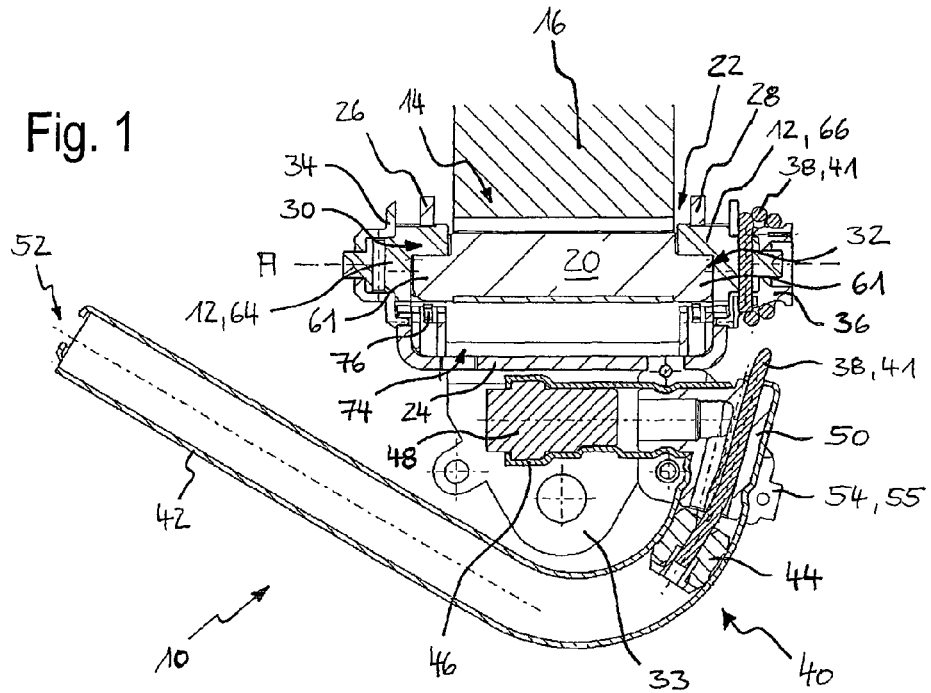
FIG. 1 shows an axial longitudinal section across a belt tensioner according to the invention.

FIGS. 1 to 4 show a belt tensioner 10 for a seat belt system in a vehicle, concretely speaking a so called end fitting tensioner, comprising a belt shaft 12 at which one end 14 of a webbing 16 is fixed and a belt shaft housing 18 adapted to be fixedly mounted on the body in which the belt shaft 12 is supported, wherein the belt shaft 12 can be rotated relative to the belt shaft housing 18 after activation of the belt tensioner 10 so as to wind up webbing 16.

In the shown embodiment, the end 14 of the webbing 16 is stitched to form a loop enclosing a belt shaft inserting element 20, wherein the belt shaft inserting element 20 is received in a recess 22 of the belt shaft 12 and is supported relative to the belt shaft 12 in a rotationally fixed manner.

Figure 2:
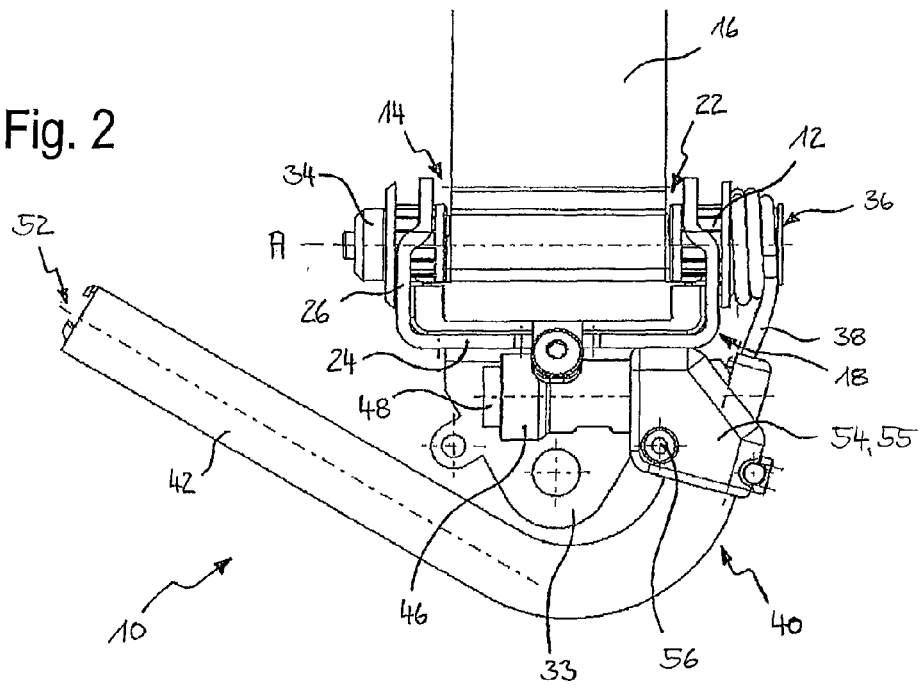
FIG. 2 is a top view of the belt tensioner according to FIG. 1.
Figure 3:
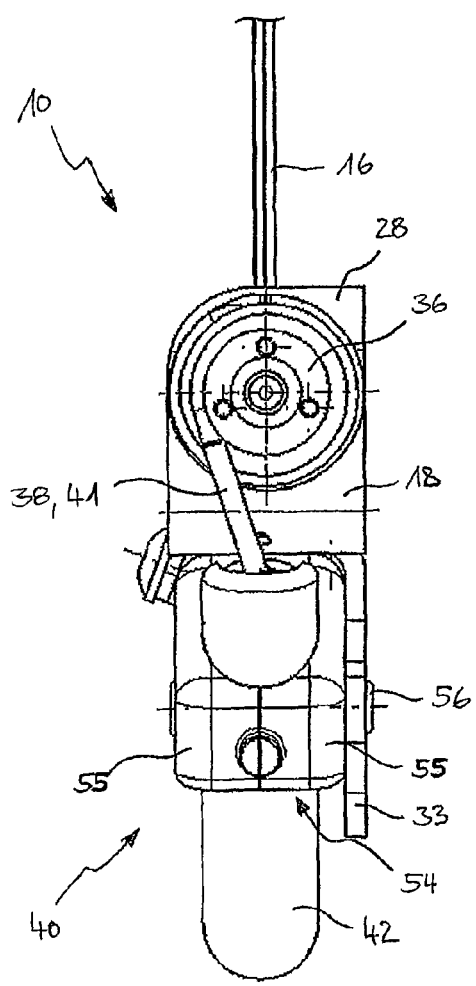
FIG. 3 is a side view of the belt tensioner according to FIG. 1.
Figure 4:
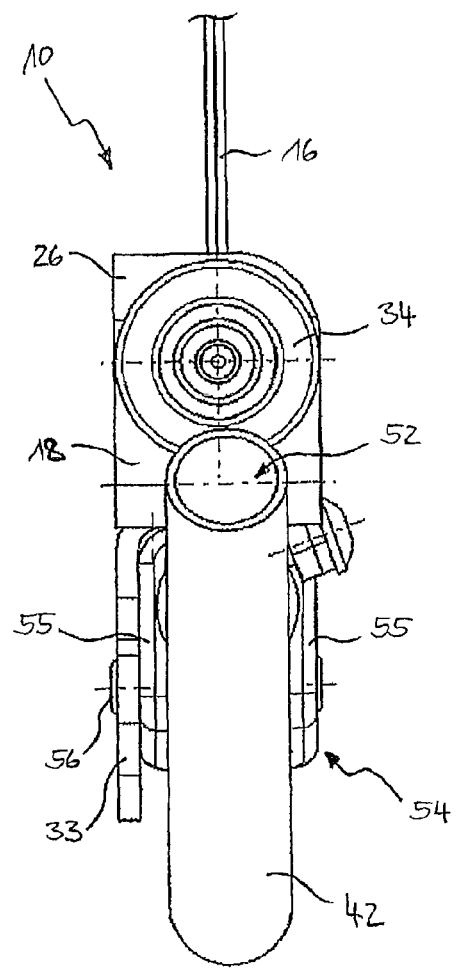
FIG. 4 is another side view of the belt tensioner according to FIG. 1.

According to FIG. 2, the belt shaft housing 18 of the belt tensioner 10 is U-shaped and comprises a housing land 24 as well as two opposite housing legs 26, 28, each housing leg 26, 28 having a housing aperture 30, 32 through which the belt shaft 12 extends. Furthermore, a securing strap 33 bent from the housing land 24 is provided through which the belt shaft housing 18 can be tightly connected, especially screwed, to a vehicle seat or a vehicle body.

The belt shaft 12 is pivoted about an axis A in the belt shaft housing 18. At the axial ends of the belt shaft 12 an end cover 34 and, resp., a rope reel 36 are disposed, the end cover 34 and the rope reel 36 being tightly connected to, especially pressed with the belt shaft 12 and preventing axial movement of the belt shaft 12 relative to the belt shaft housing 18 or minimizing the same to little axial play.

In order to be able to tighten the webbing 16 upon activation of the belt tensioner 10 a force transmission element 38 is provided for coupling the belt shaft 12 to a tensioner drive 40. In the illustrated embodiment, the force transmission element 38 is a pull rope 41 being partly wound onto the rope reel 36 and fastened by one rope end to the rope reel 36.

The tensioner drive 40 of the belt tensioner 10 comprises a tensioner tube 42 for receiving and guiding a pressurizing element 44 as well as a separate generator housing 46 for receiving a gas generator 48. The generator housing 46 is a tube length in the shown embodiment so that both the tensioner tube 42 and the generator housing 46 are made of a metal tube, especially a steel tube. Moreover, a coupling element 50 is provided for tightly connecting the generator housing 46 to the tensioner tube 42 (cf. FIG. 1).

According to FIG. 1, the pressurizing element 44 is a piston which is substantially sealed in the bent tensioner tube 42 and is accommodated to be movable along a tubular axis. The pull rope 41 fixed by one rope end to the rope reel 36 extends from the rope reel 36 into the tensioner tube 42 and is fastened there to the piston by an opposite rope end. Upon activation of the gas generator 48, gas pressure is applied to the piston and the piston moves in the direction of a free tube end 52 of the tensioner tube 42. While the belt shaft 12 rotates, pull rope 41 is unwound from the rope reel 36 and at the same time webbing 16 is wound onto the belt shaft 12 so that belt tensioning takes place.

In order to reinforce the connection between the tensioner tube 42 and the generator housing 46 and to provide a simple connection between the tensioner drive 40 and the belt shaft housing 18 a stabilizing unit 54 is further provided. Said stabilizing unit 54 in the present case includes two stabilizing elements 55, especially made of zinc die cast, and a fastener 56 configured e.g. as tubular rivet (cf. FIGS. 3 and 4).

As a matter of course, the belt tensioner 10 according to FIGS. 1 to 4 can also be driven by a hydraulic motor or can be equipped with a different alternative tensioner drive 40, especially a so called "power snake" drive. By way of example, in FIG. 23 a combined drive 57 including a "power snake" 58 as pressurizing element 44 and a pull rope 41 is shown. The power snake 58 is a flexible, elastically and/or plastically deformable plastic member which is accommodated to be largely sealed and guided to be longitudinally movable in the tensioner tube 42. Upon activation of the belt tensioner 10, gas pressure is applied to the power snake 58 which is displaced toward the free tube end 52, wherein the power snake 58 is deformed by a drive pinion 59 so that it engages in the drive pinion 59 and drives the same in the tensioning direction. Accordingly, the pull rope 41 is wound onto a rope drum 60 of the drive pinion 59, on the one hand, and is unwound from the rope reel 36 of the belt tensioner 10, on the other hand, while the belt shaft 12 rotates, so that belt tensioning takes place.

In the shown embodiments, the belt tensioner 10 has a particularly advantageous design which shall be illustrated hereinafter in detail by way of FIGS. 5 to 15.

Figure 5:
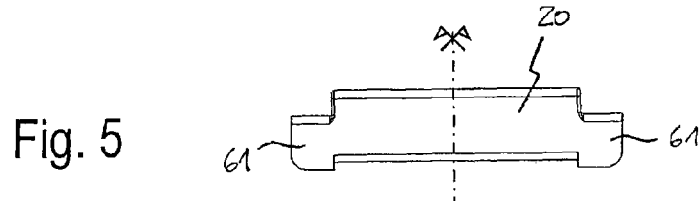
FIG. 5 is a top view of a belt shaft inserting element for the belt tensioner according to FIGS. 1 to 4.

FIG. 5 shows the belt shaft inserting element 20 which in this case is exemplified as a cut and possibly formed metal plate. For the rest, the belt shaft inserting element 20 is symmetric, especially a symmetric steel plate.

Figure 6:
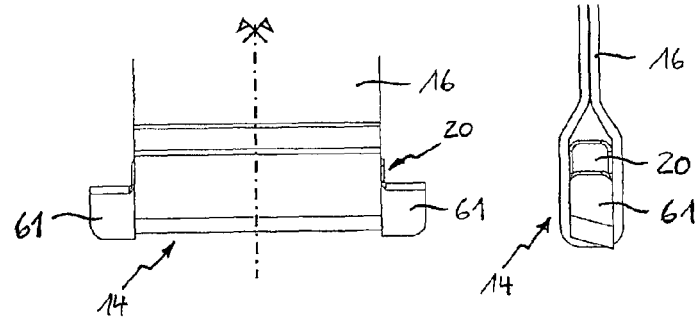
FIG. 6 is a top view and a side view of the belt shaft inserting element fastened to a webbing according to FIG. 5.

According to FIG. 6, the end 14 of the webbing 16 is stitched to form a loop, the loop enclosing the belt shaft inserting element 20. Thus the end 14 of the webbing 16 is reliably fastened on the belt shaft inserting element 20.

Opposite axial ends of the belt shaft inserting element 20 extend axially beyond the webbing 16, the axial ends being in the form of bearing portions 61 for bearing the belt shaft inserting element 20 in the belt shaft 12.

Figure 7:
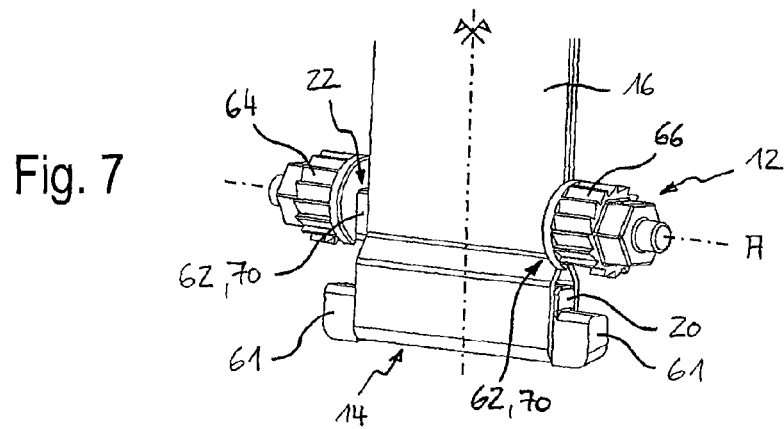
FIG. 7 shows a perspective view of the belt shaft inserting element fastened to the webbing according to FIG. 6 prior to mounting on a belt shaft.

FIG. 7 illustrates a perspective view of the belt shaft 12 comprising the recess 22 for receiving the belt shaft inserting element 20, the belt shaft inserting element 20 being adapted to be introduced into the recess 22 substantially radially relative to the axis A.

In the present embodiment the belt shaft 12 includes a fork bearing 62 for rotationally fixed fixation of the belt shaft inserting element 20, wherein the belt shaft inserting element 20 can be introduced substantially radially into the fork bearing 62.

Figure 8:
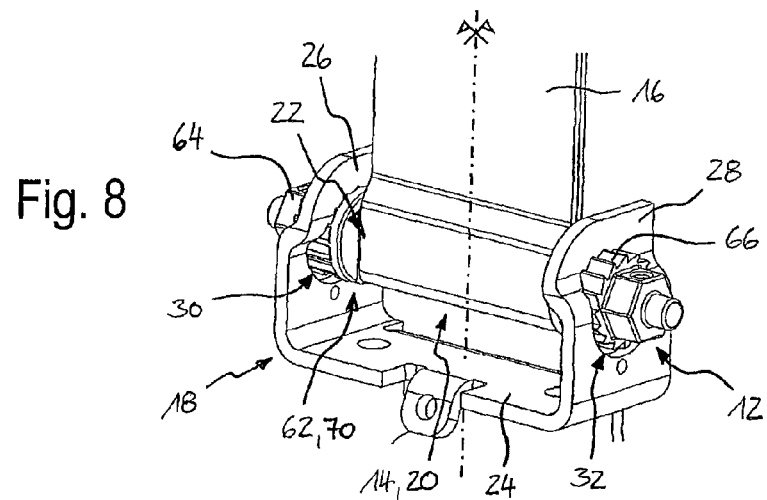
FIG. 8 shows a perspective view of the belt shaft supported in a belt shaft housing with mounted webbing.
Figures 9, 10:
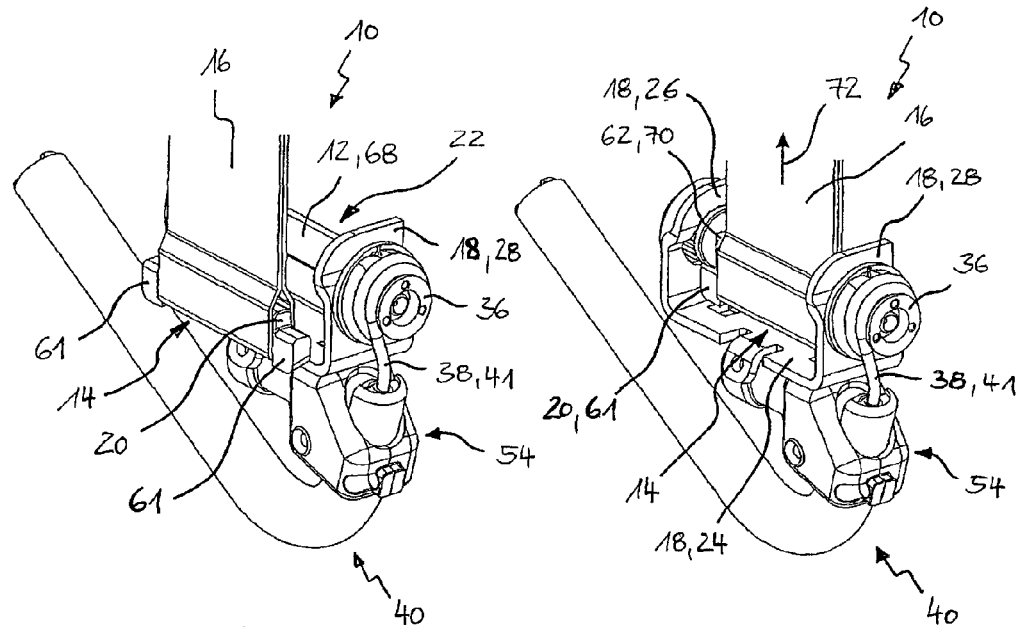
FIG. 9 shows a perspective view of the belt tensioner according to FIGS. 1 to 4 prior to mounting the belt shaft inserting element.
FIG. 10 shows a perspective view of the belt tensioner according to FIGS. 1 to 4 during mounting the belt shaft inserting element.

At its axial ends the belt shaft 12 includes shaft butts 64, 66 connected by a belt shaft land 68 (cf. FIG. 9). Due to this design, in the area of the belt shaft land 68 the recess 22 for receiving the belt shaft inserting element 20 is easily formed and in the area of the shaft butts 64, 66 a bearing of the belt shaft 12 in the belt shaft housing 18 rotatable about the axis A is formed (FIG. 8).

From FIG. 7 in combination with FIG. 1 it is further evident that in each of the two shaft butts 64, 66 a fork bearing 62 for the belt shaft inserting element 20 is formed. Said fork bearings 62 in the present case are radial bearing slits 70 in which the bearing portions 61 of the belt shaft inserting element 20 engage in an accurately fitting and positive manner so that in the mounted final state according to FIG. 8 the belt shaft inserting element 20 is connected to the belt shaft 12 in a rotationally fixed manner.

FIGS. 9 to 12 illustrate the process of subsequent mounting of the webbing 16 on the belt tensioner 10 which was fixedly installed at a seat frame or a body of a vehicle already before.

According to FIG. 9, the belt shaft inserting element 20 with webbing 16 fastened thereto is supplied to the already installed part of the belt tensioner 10, until the bearing portions 61 of the belt shaft inserting element 20 are provided radially outside the fork bearings 62 formed in the belt shaft 12 (cf. FIG. 10).

As indicated in FIG. 10 by an arrow 72, the belt shaft inserting element 20 subsequently can be introduced into the recess 22 and the fork bearings 62 by a radial movement relative to the belt shaft 12 so that the belt shaft inserting element 20 is connected to the belt shaft 12 in a rotationally fixed manner (cf. FIG. 11).

Figures 11, 12:
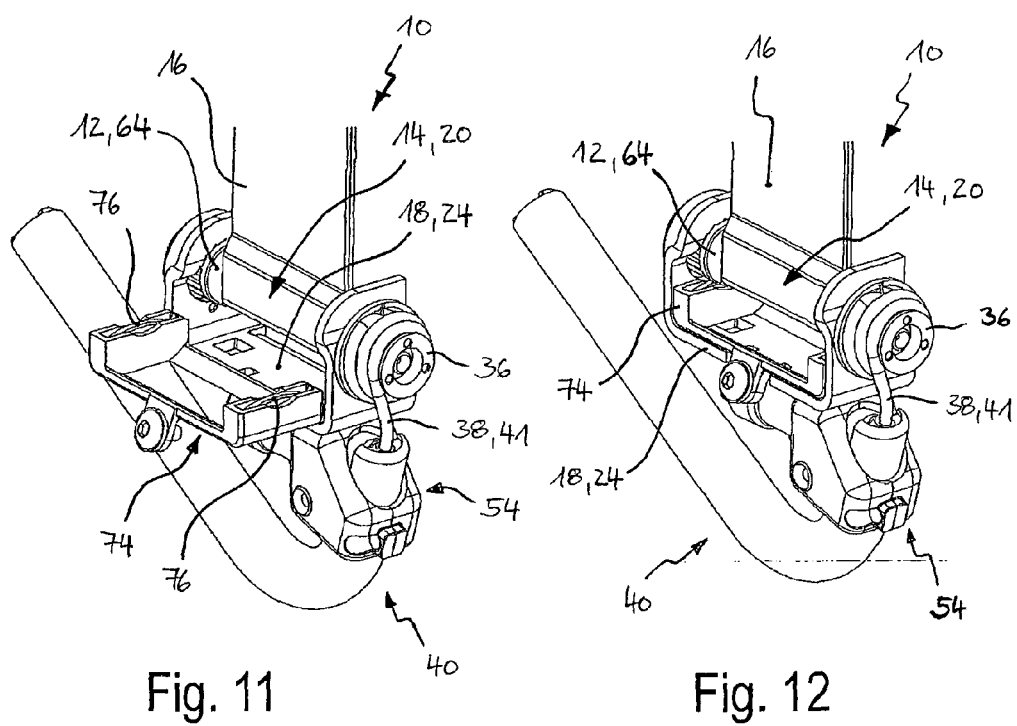
FIG. 11 shows a perspective view of the belt tensioner according to FIGS. 1 to 4 after mounting the belt shaft inserting element and prior to mounting a belt shaft securing unit.
FIG. 12 shows a perspective view of the belt tensioner according to FIGS. 1 to 4 in the completely mounted state.

In order to prevent the belt shaft inserting element 20 and the webbing 16 fastened thereto from inadvertently detaching from the belt shaft 12, according to FIG. 11 a belt shaft securing unit 74 is inserted between the belt shaft 12 and the housing land 24 of the belt shaft housing 18 and is fixed at the belt shaft housing 18 (FIG. 12). Said belt shaft securing unit 74 is designed such that it can be inserted only when the belt shaft inserting element 20 is correctly mounted on the belt shaft 12 so that faulty mounting of the belt shaft inserting element 20 on the belt shaft 12 is excluded.

Moreover, the belt shaft securing unit 74 includes spring elements 76 which in the completely mounted state of the belt tensioner 10 according to FIG. 12 drive the belt shaft 12 into its locked position.

Figure 13:
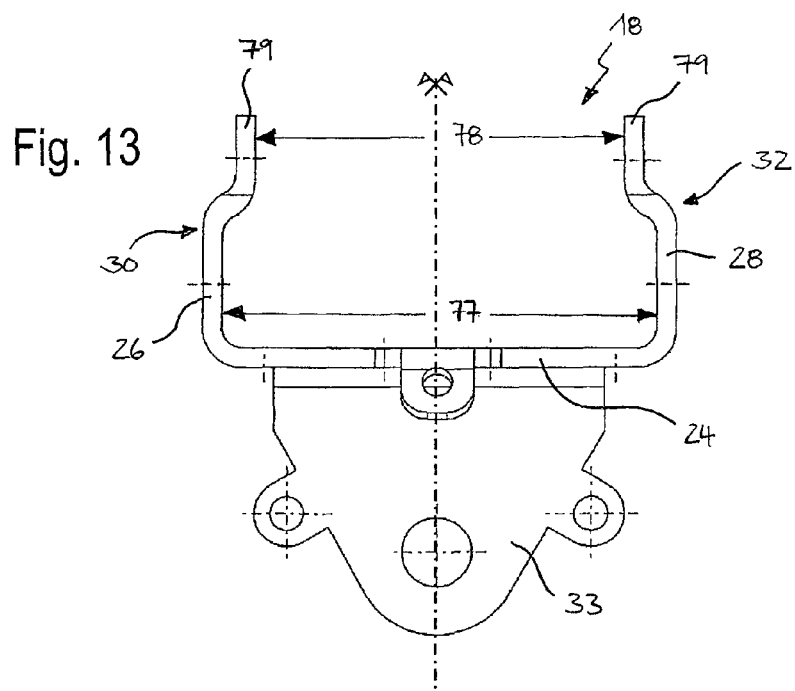
FIG. 13 is a detailed view of a belt shaft housing for the belt tensioner according to FIGS. 1 to 4.
Figures 14, 15:
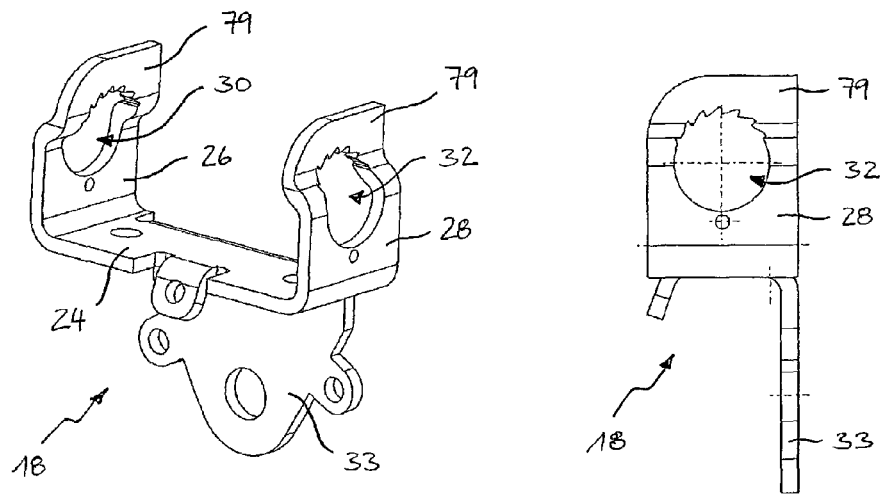
FIG. 14 is a perspective view of the belt shaft housing according to FIG. 13.
FIG. 15 is a side view of the belt shaft housing according to FIG. 13.

FIGS. 13 to 15 show different detailed views of the belt shaft housing 18. Therefrom it is visible that the belt shaft housing 18 is U-shaped in axial section and includes the housing land 24 as well as two opposite housing legs 26, 28, wherein each housing leg 26, 28 has a housing aperture 30, 32 through which the belt shaft 12 can extend (cf. FIGS. 1 and 2).

A distance 77 between the housing legs 26, 28 in the area of the housing land 24 is larger than a distance 78 in the area of the free leg ends 79 so that the housing shape in this axial section reminds of the Greek capital letter "omega".

The distance between the housing legs 26, 28 according to FIGS. 13 and 14 varies exclusively in the area of the housing apertures 30, 32.

This housing shape contributes to an especially advantageous force flow inside the belt tensioner 10, as it is possible due to this housing shape to hook the belt shaft inserting element 20 stitched into the webbing 16 in the belt shaft 12 for introducing load and to dimension the same so that the breaking load is introduced into the belt shaft housing 18 via the belt shaft inserting element 20. Thus it is possible to manufacture the belt shaft 12 as cast part, especially made of zinc die cast.

Figure 16:
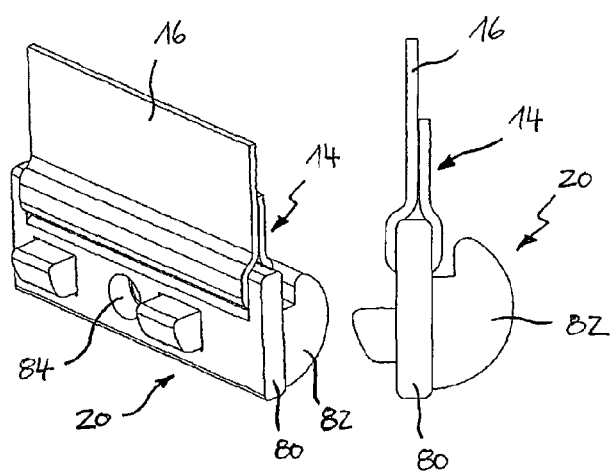
FIG. 16 shows the belt shaft inserting element for the belt tensioner of the invention in accordance with an alternative embodiment.

FIG. 16 shows the belt shaft inserting element 20 with webbing 16 fastened thereto according to an alternative embodiment. The belt shaft inserting element 20 is formed in two parts in this case comprising a base 80 on which the end 14 of the webbing 16 is fastened as well as a winding form 82 connected to the base 80 in a rotationally fixed manner. The winding form 82 serves for providing a more symmetric, ideally circular core for winding the webbing 16.

The base 80 and the winding form 82 possibly can be screwed to each other, which is indicated by a threaded bore 84 in FIG. 16. In this case it is imaginable to screw also the belt shaft 12, concretely speaking the belt shaft land 68 of the belt shaft 12, to the belt shaft inserting element 20, concretely speaking to the base 80 and the winding form 82. Via such screw connection, possibly with torque interrogation, likewise a correct mounting of the belt shaft inserting element 20 on the belt shaft 12 can be ensured so that regarding this function the belt shaft securing unit 74 can be dispensed with.

Figure 17:
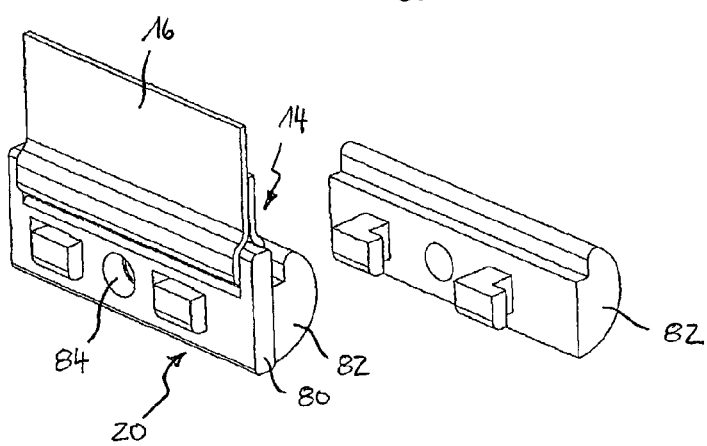
FIG. 17 shows the belt shaft inserting element for the belt tensioner of the invention in accordance with another alternative embodiment.

FIG. 17 shows another alternative embodiment of a two-part belt shaft inserting element 20 which differs from the embodiment according to FIG. 16 merely by the connection between the base 80 and the winding form 82.

Figure 18:
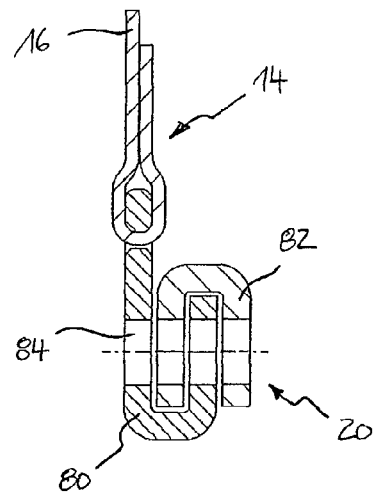
FIG. 18 shows a section across the belt shaft inserting element for the belt tensioner of the invention in accordance with another alternative embodiment.
Figure 19:
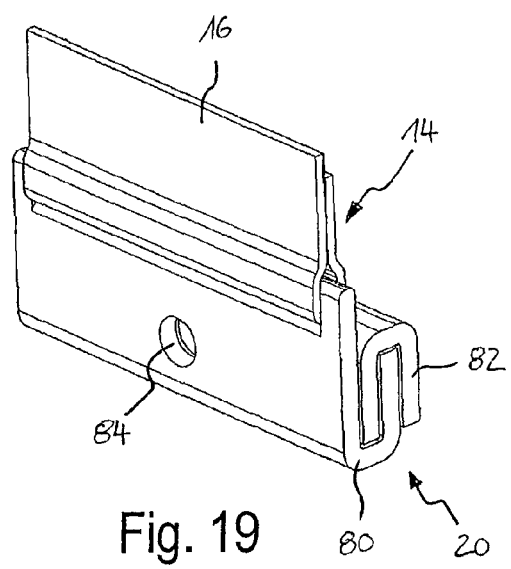
FIG. 19 shows a perspective view of the belt shaft inserting element according to FIG. 18.

FIGS. 18 and 19 show a further alternative embodiment of a two-part belt shaft inserting element 20 which, compared to the two previous embodiments, merely differs by the shaping of the base 80 and the winding form 82 again.

It is the objective of these belt shaft inserting elements 20 composed of several parts to provide, together with the belt shaft land 68 of the belt shaft 12 (cf. FIG. 9), a core which is possibly symmetric, ideally circular relative to the axis A for winding up the webbing 16.

Figure 20:
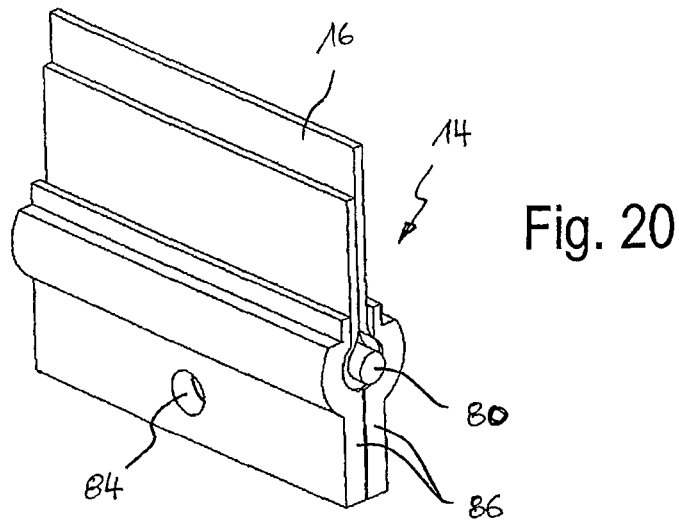
FIG. 20 shows the belt shaft inserting element for the belt tensioner of the invention in accordance with another alternative embodiment during assembly.
Figure 21:
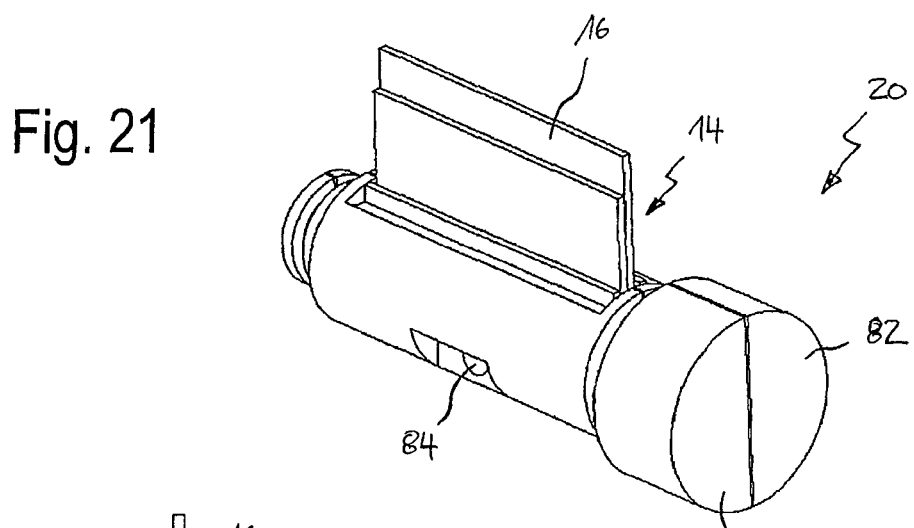
FIG. 21 shows the belt shaft inserting element according to FIG. 20 after being assembled.
Figure 22:
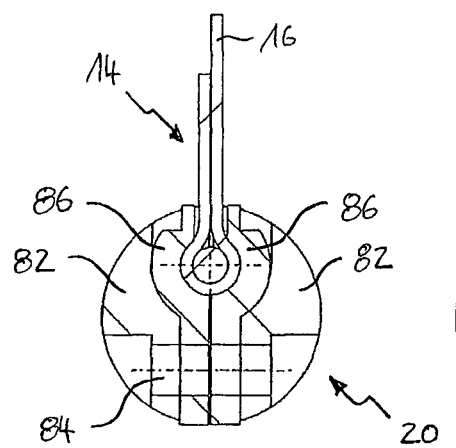
FIG. 22 shows the belt shaft inserting element according to FIG. 21 in section.

FIGS. 20 to 22 illustrate another alternative embodiment of a multi-part shaft inserting element 20 which is already very close to an ideal circular core for winding up the webbing 16.

The base 80 of the belt shaft inserting element 20 according to FIG. 20 in the form of an inserting pin is first inserted into the loop formed at the end 14 of the webbing 16 and is radially fixed by two intermediate elements 86. After that, the two-part winding form 82 is arranged and the multi-part belt shaft inserting element 20 is fixed by a screw screwed into the threaded bores 84.

Figure 23:
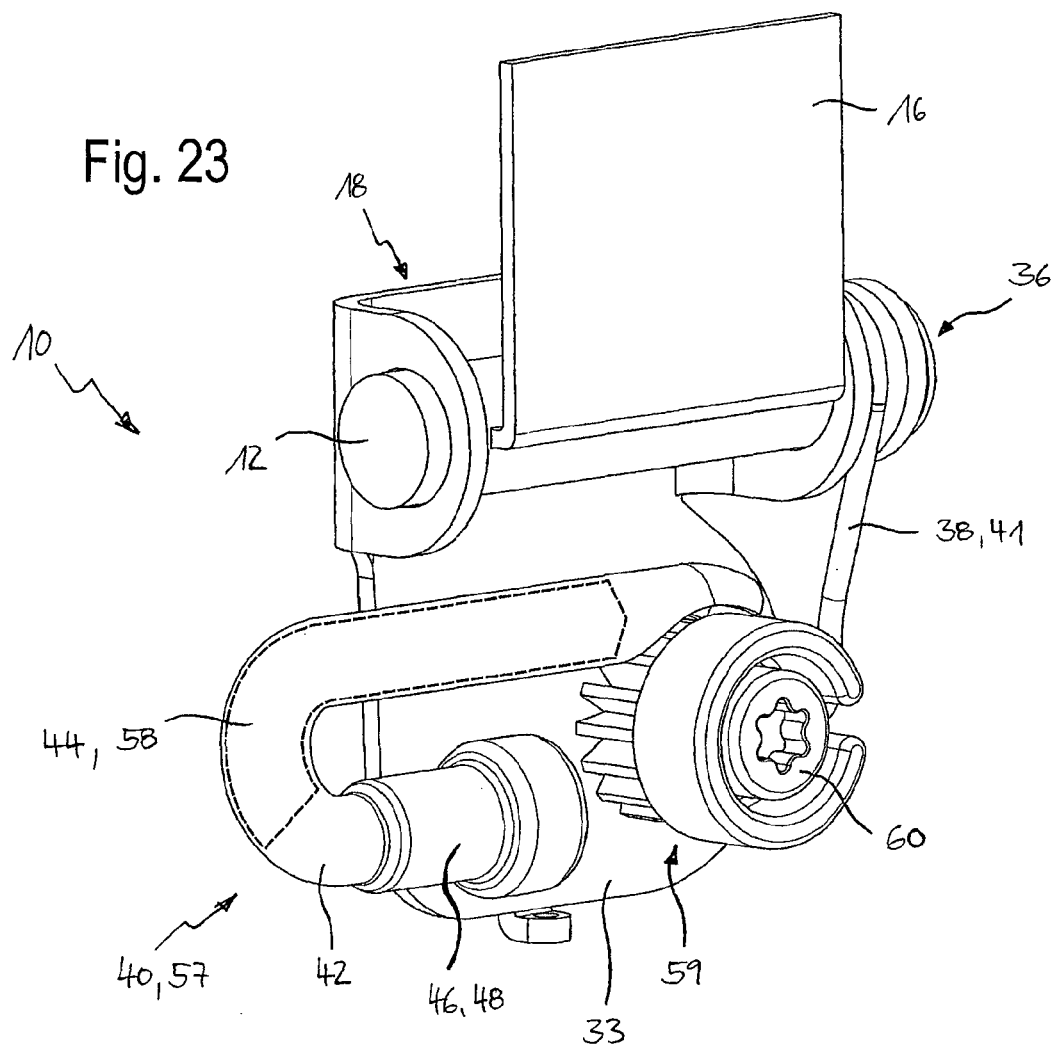
FIG. 23 shows a schematic perspective view of a belt tensioner according to the invention comprising an alternative tensioner drive.
Figures 24, 25:
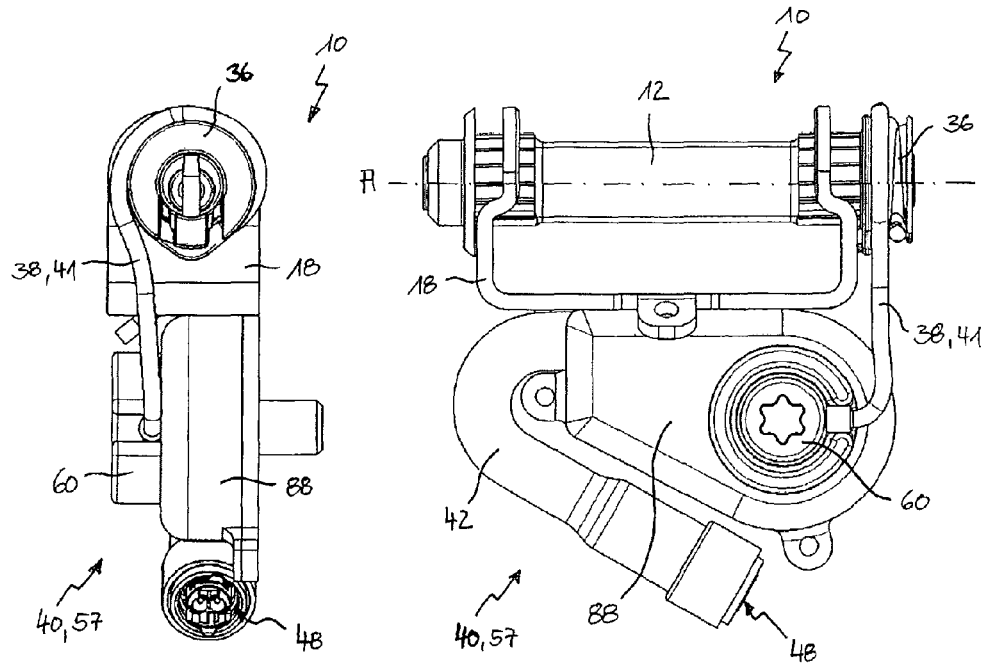
FIG. 24 shows a side view of the belt tensioner of the invention according to another embodiment.
FIG. 25 is a top view of the belt tensioner according to FIG. 24.
Figure 26:
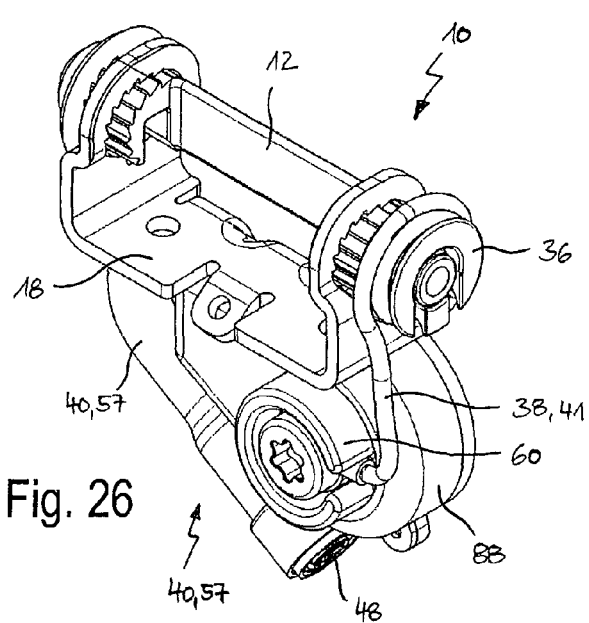
FIG. 26 is a perspective view of the belt tensioner according to FIG. 24.
Figure 27:
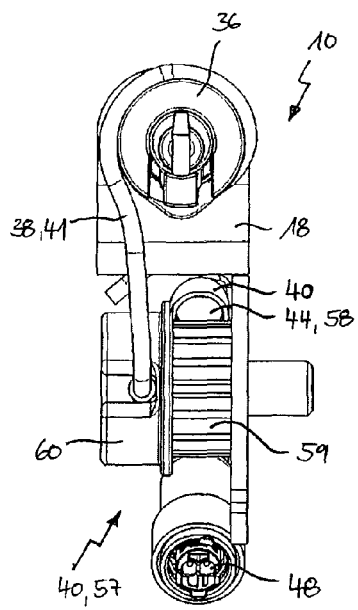
FIG. 27 shows the side views of the belt tensioner according to FIG. 24 without the housing of the tensioner drive.
Figure 28:
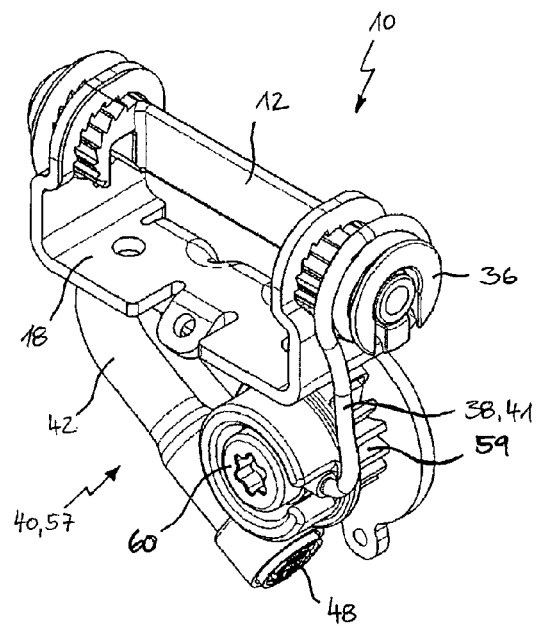
FIG. 28 shows the perspective view of the belt tensioner according to FIG. 26 without the housing of the tensioner drive.

FIGS. 24 to 26 show a side view, a top view and a perspective view of the belt tensioner 10 according to another especially compact embodiment. The functioning of this belt tensioner 10 exactly corresponds to the functioning of the belt tensioner 10 according to FIG. 23 so that the foregoing description concerning FIG. 23 is explicitly referred to in this context.

The belt tensioner 10 according to FIGS. 24 to 26 especially is an end fitting tensioner for a seat belt system and comprises the belt shaft housing 18, the belt shaft 12 pivoted about the axis A in the belt shaft housing 18, the rope reel 36 tightly connected to the belt shaft 12 as well as the tensioner drive 40. The tensioner drive 40 includes the tensioner tube 42, the deformable plastic element guided to be longitudinally movable in the tensioner tube 42, the drive pinion 59 and the pull rope 41 which is partly wound onto the rope reel 36. The plastic element can engage in the drive pinion 59 and can drive the drive pinion 59 in the tensioning direction, wherein upon rotation of the drive pinion 59 the pull rope 41 is wound onto a rope drum 60 of the drive pinion 59, on the one hand, and is unwound from the rope reel 36, on the other hand, while the belt shaft 12 rotates.

It is evident from FIG. 26 that also in this embodiment of the belt tensioner 10 the already afore-described belt shaft 12 having the recess 22 for receiving a belt shaft inserting element 20 adapted to be radially inserted in the recess 22 is used. Alternatively it is also imaginable, however, that a conventional belt shaft is employed at which the webbing end either has to be fixed before mounting the belt tensioner or is axially inserted and fixed after mounting the belt tensioner, for which purpose a rather large space is required in the axial direction, however.

According to FIGS. 24 to 26, the tensioner drive 40 comprises a housing 88 in which a portion of the tensioner tube 42 and the drive pinion 59 are accommodated. Furthermore, the housing 88 defines a linear receiving space 90 into which the deformable plastic element extends after activation of the belt tensioner 10 (cf. also FIG. 30). For better comprehension of the detailed design and function of the belt tensioner 10, the tensioner drive 40 is illustrated without its housing 88 in the following FIGS. 27 to 30.

Analogously to FIGS. 24 and 26, FIGS. 27 and 28 show a side view and a perspective view, respectively, of the belt tensioner 10, without the housing 88 of the tensioner drive 40, however.

Figure 29:
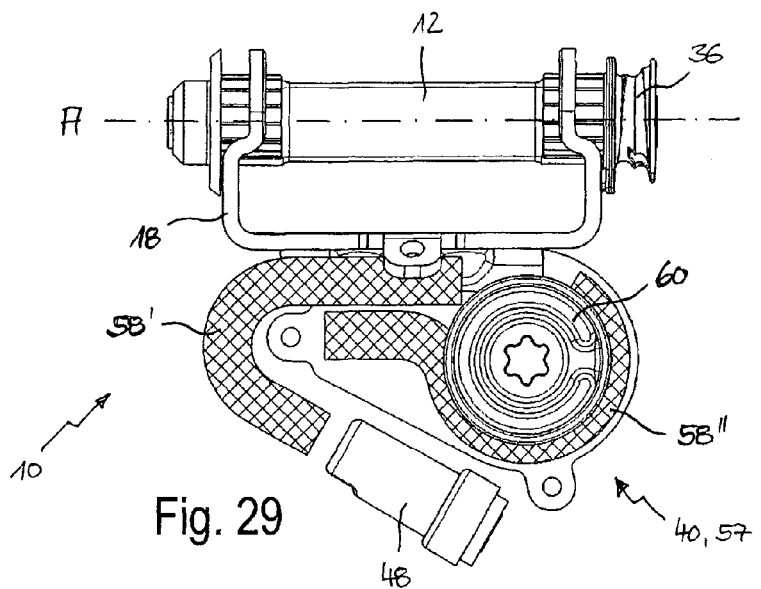
FIG. 29 shows the top view of the belt tensioner according to FIG. 25 without the tensioner tube, the pull rope and the housing of the tensioner drive.

FIG. 29 shows, analogously to FIG. 25, a top view of the belt tensioner 10, wherein the housing 88 of the tensioner drive 40, the tensioner tube 42 and the pull rope 41 are not shown so that an initial position 58' of the deformable plastic element prior to activation of the belt tensioner 10 and a final position 58" of the deformable plastic element after activation of the belt tensioner 10 are clearly visible.

The flexible as well as elastically and/or plastically deformable plastic element is also referred to as power snake 58 and in its initial position 58' is accommodated to be largely sealed in the tensioner tube 42 and is guided to be longitudinally movable with respect to a tube axis of the tensioner tube 42. After triggering the gas generator 48, gas pressure is applied to the power snake 58 which is displaced in the direction of the free tube end 52 or the drive pinion 59, the power snake 58 being deformed by the drive pinion 59 so that the power snake 58 engages in the drive pinion 59 and drives the same in the tensioning direction. Accordingly, pull rope 41 is wound onto the rope drum 60 of the drive pinion 59, on the one hand, and is unwound from the rope reel 36 of the belt tensioner 10, on the other hand, while the belt shaft 12 rotates, so that belt tensioning takes place.

The described tensioner drive 40 is extremely reliable so that the belt tensioner 10 preferably configured as end fitting tensioner performs desired belt tensioning in a reliable and reproducible manner.

In order to obtain an as compact tensioner drive 40 as possible, both a portion of the tube axis of the tensioner tube 42 and a portion of a longitudinal axis of the linear receiving space 90 extend in parallel to the axis of rotation A of the belt shaft 12. This is shown in FIG. 30, wherein the portion of the tube axis of the tensioner tube 42 parallel to the axis A is provided with the reference numeral B and the portion of the longitudinal axis of the linear receiving space 90 parallel to the axis A is provided with the reference numeral C.

In FIG. 31 the space required by the belt tensioner 10 according to FIGS. 1 to 4 is compared to the space required by the belt tensioner 10 according to FIGS. 24 to 29. Due to the modified tensioner drive 40, the belt tensioner 10 according to FIGS. 24 to 29 is definitely more compact in the axial direction, with an approximately identical dimension h perpendicularly to the axis A, than the belt tensioner 10 according to FIGS. 1 to 4.

In the belt tensioner 10 according to FIGS. 24 to 29 the structural length of the tensioner drive 40 is adapted to the belt shaft 12 so that an axial dimension d of the belt shaft 12 substantially corresponds to an axial dimension d of the tensioner drive 40. Since the axial dimension of the belt tensioner 10 is largely determined by the width of the webbing 16 to be wound up and the necessary dimension of the belt shaft 12 resulting therefrom, the axial space required by the belt tensioner 10 is minimal in this case.

The invention claimed is:

1. A belt tensioner for a seat belt system, comprising
a belt shaft housing (18),
a belt shaft (12) having a recess (22) and pivoted about an axis (A) in the belt shaft housing (18),
a belt shaft inserting element (20) to which one end (14) of a webbing (16) is secured, wherein the belt shaft inserting element (20) is adapted to be introduced substantially radially into the recess (22),
a belt shaft securing unit (74) for engaging the belt shaft inserting element (20) to prevent movement of the belt shaft inserting element (20) out of the recess (22) while allowing for relative movement between the belt shaft inserting element (20) and the belt shaft securing unit (74),
a rope reel (36) which is tightly connected to the belt shaft (12), as well as
a tensioner drive (40) including a tensioner tube (42), a deformable plastic element guided to be longitudinally movable in the tensioner tube (42), a drive pinion (59) and a pull rope (41) which is partly wound onto the rope reel (36),
wherein the plastic element is adapted to engage in the drive pinion (59) and to drive the drive pinion (59) in the tensioning direction, and
wherein during rotation of the drive pinion (59) the pull rope (41) is wound onto a rope drum (60) of the drive pinion (59), on the one hand, and is unwound from the rope reel (36), on the other hand, while the belt shaft (12) rotates.

2. The belt tensioner according to claim 1, wherein the belt shaft (12) includes a fork bearing (62) for fixing the belt shaft inserting element (20) in a rotationally fixed manner, wherein the belt shaft inserting element (20) is adapted to be introduced substantially radially into the fork bearing (62).

3. The belt tensioner according to claim 1, wherein the belt shaft (12) is symmetric.

4. The belt tensioner according to claim 1, wherein the belt shaft housing (18) is symmetric.

5. The belt tensioner according to claim 1, wherein an axial dimension (d) of the belt shaft (12) substantially corresponds to an axial dimension (d) of the tensioner drive (40).

6. The belt tensioner according to claim 1, wherein a tube axis of the tensioner tube (42) extends in portions in parallel to the axis (A).

7. The belt tensioner according to claim 1, wherein the tensioner drive (40) includes a housing (88) with a linear receiving space (90) having portions that extend parallel to the axis (A), the deformable plastic element being received in the linear receiving space (90) after activation of the belt tensioner (10).

8. The belt tensioner according to claim 1, wherein the belt shaft securing unit (74) includes at least one spring (76) for biasing the belt shaft inserting element (20) into the recess (22).

9. The belt tensioner according to claim 1, wherein the belt shaft securing unit (74) engages the belt shaft inserting element (20) and the belt shaft housing (18) to prevent movement of the belt shaft inserting element (20) out of the recess (22).

10. A belt tensioner for a seat belt system, comprising
a belt shaft housing (18) that is substantially U-shaped in an axial section and includes a housing land (24) as well as two opposite housing legs (26, 28), each housing leg (26, 28) terminating at a free leg end (79) and including a housing aperture (30, 32), wherein a distance between the housing legs (26, 28) is larger in the area of the housing land (24) than in the area of the free leg ends (79);
a belt shaft (12) extending through the housing apertures (30, 32) and pivoted about an axis (A) in the belt shaft housing (18),
a rope reel (36) which is tightly connected to the belt shaft (12) as well as
a tensioner drive (40) including a tensioner tube (42), a deformable plastic element guided to be longitudinally movable in the tensioner tube (42), a drive pinion (59) and a pull rope (41) which is partly wound onto the rope reel (36),
wherein the plastic element is adapted to engage in the drive pinion (59) and to drive the drive pinion (59) in the tensioning direction, and
wherein during rotation of the drive pinion (59) the pull rope (41) is wound onto a rope drum (60) of the drive pinion (59), on the one hand, and is unwound from the rope reel (36), on the other hand, while the belt shaft (12) rotates.

11. The belt tensioner according to claim 10, wherein the distance between the housing legs (26, 28) is larger in the area of the housing land (24) than at the free leg ends (79) such that the housing (18) is substantially omega shaped in an axial section.

12. The belt tensioner according to claim 10, wherein the distance between the housing apertures (30, 32) varies.

13. A belt tensioner for a seat belt system, comprising:
    a belt shaft housing (18),
    a belt shaft (12) pivoted about an axis (A) in the belt shaft housing (18),
    a belt shaft inserting element (20) to which one end (14) of a webbing (16) is secured,
    a fastener extending through the belt shaft (12) and the belt shaft inserting element (20) without extending through the webbing (16) to prevent relative movement between the belt shaft (12) and the belt shaft inserting element (20),
    a rope reel (36) which is tightly connected to the belt shaft (12), and
    a tensioner drive (40) including a tensioner tube (42), a deformable plastic element guided to be longitudinally movable in the tensioner tube (42), a drive pinion (59) and a pull rope (41) which is partly wound onto the rope reel (36),
    the plastic element being adapted to engage in the drive pinion (59) and to drive the drive pinion (59) in the tensioning direction,
    during rotation of the drive pinion (59) the pull rope (41) is wound onto a rope drum (60) of the drive pinion (59) on the one hand and is unwound from the rope reel (36) on the other hand while the belt shaft (12) rotates.

14. The belt tensioner according to claim 13, wherein the webbing (16) is free of openings for receiving the fastener.

\* \* \* \* \*